Patented June 1, 1926.

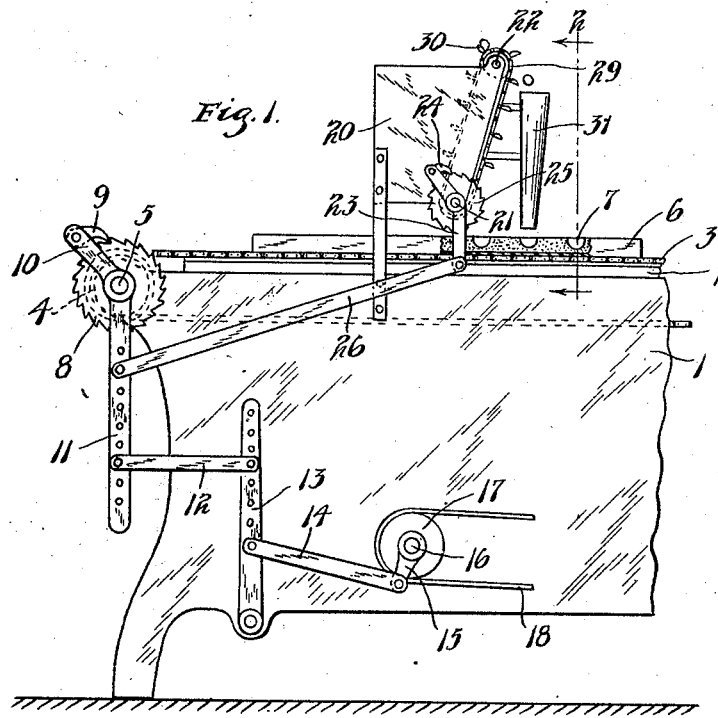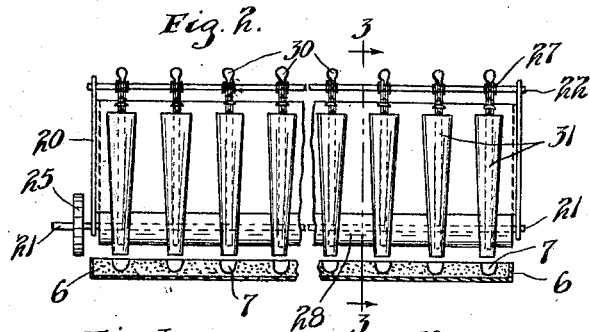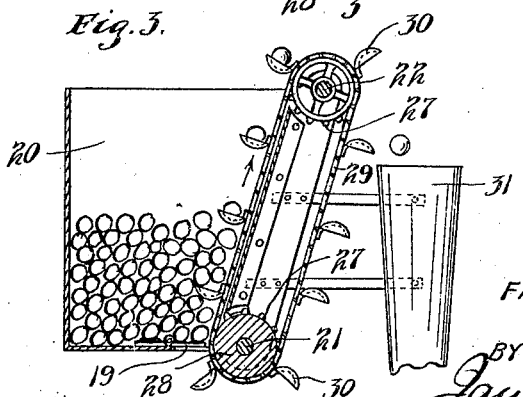

1,587,088

UNITED STATES PATENT OFFICE.

FRANK M. SCHULER, OF WINONA, MINNESOTA, AND WALTER C. DRURY, OF FULTON, ILLINOIS.

ARTICLE-FEEDING DEVICE FOR CANDY MACHINES.

Application filed September 18, 1924. Serial No. 738,391.

This invention relates to article feeding devices particularly adapted to feed nuts, cherries and similar articles. While the invention is applicable to different machines, it is particularly designed for use with a candy making machine in which a tray having rows of molds therein is moved on a traveling member. Such candy making machines are now largely used for making various pieces of candy such as nut bars, nougats, etc. The tray having the molds therein is moved on a traveling member and successively brought beneath the spouts of a container which discharges the desired candy making materials therein. It has been the common practice to have a line of operators on each side of the machine to place the nuts, cherries or other articles used in the pieces of candy in the molds. The present machine is designed to simultaneously feed or place a large number of articles into the molds at one time.

It is an object of this invention to provide a simple and efficient article feeding device comprising a hopper and carriers movable therethrough adapted singly to pick up the articles and discharge them into directing means by which they are placed in the molds.

It is a further object of the invention to provide such a feeding device comprising a hopper, adapted to be disposed over a traveling member, having a series of endless conveyors moving therethrough provided with means for singly picking up the articles and dropping the same into a series of chutes which direct the same to the desired locations, together with means for synchronously moving said conveyors and the traveling member.

These and other objects and advantages of the invention will be fully set forth in the following description made in connection with the accompanying drawings in which like reference characters refer to the same parts throughout the different views, and in which, Fig. 1 is a view in side elevation of a portion of a candy making machine showing the invention applied thereto;

Fig. 2 is a vertical section taken on the line 2—2 of Fig. 1, as indicated by the arrows; and Fig. 3 is a vertical section taken on the line 3—3 of Fig. 2, as indicated by the arrows and shown on an enlarged scale.

Referring to the drawings, a candy making machine of modern type is shown of which it will only be necessary to consider the frame member 1 having a top portion or table 2 over which moves the top 1 of an endless traveling member 3 illustrated as in the form of a chain, said member being propelled by a sprocket 4 carried on a shaft 5 supported in suitable bearings at one end of the frame 1. The traveling member 3 carries trays 6 having therein a plurality of molds 7. While the members 6 might be of various forms, it is the usual practice to have such members in the form of shallow boxes or trays filled with fine starch in which the depressions or molds 7 are formed. The molds 7 are adapted successively to receive various parts of the candy material and determine the shape of the piece. It is the common practice to make candy pieces containing nuts, cherries, and other similar articles and it is for the purpose of placing these articles that the present invention is designed.

The traveling member 3 is intermittently moved and while various mechanisms may be used for this purpose, in the embodiment of the invention illustrated, a ratchet wheel 8 is shown attached to the shaft 5 adapted to be engaged by a pawl 9 carried on one end of an arm 10 of a lever journaled on the shaft 5 having a downwardly extending arm 11 provided with a plurality of longitudinally spaced holes. A link 12 is adapted to have one end secured in one of the holes in arm 11 and has its other end secured in one of a plurality of longitudinally spaced holes formed in a swinging arm 13 pivotally mounted at its lower end on a stud or shaft secured in frame 1. The arm 13 is oscillated by means of a link or pitman 14, one end of which is adapted to be received in one of the holes in arm 13, the other end of which is pivotally connected to a crank arm 15 carried on a shaft 16 driven by a pulley 17 over which travels a belt 18 which will be connected to some suitable source of power.

The feeding device proper comprises a hopper 20 shown as of general rectangular form, with one side inclined upwardly and outwardly. The hopper is provided with bearings adjacent the top and bottom of said side in which are mounted shafts 21 and 22. While either one of these shafts may be driven, in the embodiment of the invention illustrated, the lower shaft 21 is shown as having a bell crank 23 journaled on one end thereof, the upper arm of which carries a pawl 24 adapted to engage the teeth on a ratchet wheel 25 secured to said shaft. The lower arm of lever 23 is pivoted to one end of a link 26, the other end of which is adapted to be pivotally connected in one of the holes in the lever arm 11. The shafts 21 and 22 each have thereon a series of spaced sprocket wheels 27 and shaft 21 has a series of filler members 28 of cylindrical form thereon between said sprockets. Chains 29 extend over respective pairs of alined sprockets on shafts 21 and 22, which chains carry small cups 30. The sprockets 27 extend into the hopper 20 and the chains 29 travel about said sprockets and pass upwardly through the hopper closely adjacent the rear or upwardly inclined side thereof. It will be noted that the rear side wall of the hopper terminates closely adjacent the upper sprockets 27 and extends down closely adjacent to the filler members 28. The hopper 20 has a series of openings in its bottom covered by flaps 19 which may be hinged as shown. Said flaps are either resilient or resiliently held in closed position so as to be lifted by cups 30 as they pass into the hopper, and to close between the entrance of successive cups. Disposed in the rear of the hopper alined with each of the chains 29 is a downwardly extending tube or spout 31 tapered towards its lower end and adapted to aline with one of the molds 7 in tray 6. The tubes or spouts 31 will be supported from the hopper in any convenient manner, as by the supporting arms shown.

In operation, the articles, such as the cherries, indicated in Fig. 3, will be placed in the hopper 20. By the rotation of the pulley 17, arm 13 will be oscillated, as will also arms 11, and conveyor 3 will be intermittently progressed by the pawl 9 engaging the ratchet wheel 4. The speed of the conveyor will be properly regulated by placing the links 12 and 14 in the proper holes in the arms 11 and 13. The ratchet wheel 25 will also be intermittently rotated through the link 26, and the chains 29 will be moved through hopper 20 in the direction indicated by the arrow in Fig. 3. The link 26 can be adjusted in arms 11 to give the proper timing to the movement of chains 29. As the chains with the cups 30 move upwardly through the hopper, a cherry will become deposited in each of the cups 30 and will be carried upwardly therein over the upper sprockets 27. As the cup passes over the top of the sprocket the cherry will be discharged and will fall down into the upper end of one of the tubes 31. The tube 31 will guide the cherry down into the proper mold 7, the bottom of said tube terminating closely adjacent the mold. The device will be so timed that the mold cavity will be under the lower end of the tube 31 when the cherry drops therefrom and the mold will preferably at this time have just come to rest. It will be seen that during the period of movement of the parts the cherry is moved over the top of the conveyor 29 and must drop through tube 31. With each movement, therefore, of the conveyor 3 a new row of molds 7 will be brought beneath the tubes 31 and the chains 29 will be so moved that a row of cups will discharge the cherries into the tubes 31 with each of such movements of the conveyor 3. The cherry or other article will thus be properly deposited in each of the molds 7 and it will be unnecessary to place any of the articles in the molds by hand.

From the above description it is seen that applicant has provided a simple and efficient article feeding means adapted to properly place the article in the candy molds. The device is easily operated from the moving parts of the candy machine and is conveniently mounted on said machine. The device eliminates the necessity for a large number of operators for placing the articles and the entire action is automatic.

It will, of course, be understood, that various changes may be made in the form, details, arrangement and proportions of the parts without departing from the scope of applicants' invention, which, generally stated, consists in a device capable of carrying out the objects above set forth such as shown and described and defined in the appended claims.

What is claimed is:

1. The combination with a traveling conveyor of a candy making machine and a member having a plurality of rows of molds therein carried by said conveyor, of an article feeding device comprising a hopper supported adjacent said conveyor adapted to contain the articles to be fed, and automatic means comprising a series of members movable through said hopper for singly selecting articles from said hopper and depositing the same into said molds.

2. A candy making machine having in combination, an intermittently movable conveyor, a member carried thereby having a plurality of rows of molds therein, a hopper adapted to receive an irregular mass of articles and intermittently movable means for selecting articles from said hopper, and means directing said articles into a plurality of said molds, said articles being singly delivered respectively to each mold of a row.

3. The combination with a traveling conveyor of a candy making machine, and a member having a plurality of rows of molds therein carried by said conveyor, of an article feeding device comprising a hopper adapted to contain the articles to be fed, a series of traveling carriers movable through said hopper, each having a series of spaced means thereon for picking up an article, a series of discharge members arranged to aline with said molds to which the articles are successively delivered by said last mentioned means.

4. The structure set forth in claim 3, means for intermittently advancing said conveyor to bring a row of molds under said discharge members, and means for moving the said series of carriers synchronously with said conveyor to discharge plurality of the articles into each row of molds one to each mold in said rows.

5. A candy making machine having in combination, an intermittently movable conveyor, a member carried thereby having a plurality of rows of molds therein, a hopper, a series of intermittently movable members carrying means for singly selecting articles from said hopper, means for directing the articles so selected to said molds, and means for synchronously moving said conveyor and said movable members.

6. A candy making machine having in combination, a hopper, an intermittently moving conveyor adapted to support a tray having rows of molds therein, a series of spouts disposed across said conveyor and having lower ends, respectively, alining with the molds in one of said rows, a series of members movable through said hopper alined with said spouts and having means for selecting articles and delivering the same simultaneously to said spouts, and a common means for operating said conveyor and members.

In testimony whereof we affix our signatures.

FRANK M. SCHULER.
WALTER C. DRURY.